United States Patent
Gholami et al.

(10) Patent No.: US 11,187,858 B2
(45) Date of Patent: Nov. 30, 2021

(54) ELECTRICALLY-CONTROLLED FIBER-OPTIC SWITCHING SYSTEM

(71) Applicant: INTERNATIONAL BUSINESS MACHINES CORPORATION, Armonk, NY (US)

(72) Inventors: Faezeh Gholami, Ridgewood, NJ (US); Michael Cracraft, Poughkeepsie, NY (US); Matteo Cocchini, Long Island City, NY (US); Vahe Minassian, Hopewell Junction, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/804,130

(22) Filed: Feb. 28, 2020

(65) Prior Publication Data
US 2021/0271032 A1   Sep. 2, 2021

(51) Int. Cl.
*G02B 6/38* (2006.01)
*G02B 6/44* (2006.01)

(52) U.S. Cl.
CPC .......... *G02B 6/3885* (2013.01); *G02B 6/3825* (2013.01); *G02B 6/3893* (2013.01); *G02B 6/4403* (2013.01)

(58) Field of Classification Search
CPC .......... G02B 6/3825; G02B 6/38; G02B 6/00; G02B 6/4403; G02B 6/42
(Continued)

(56) References Cited

U.S. PATENT DOCUMENTS 3,208,342 A * 9/1965 Nethercot, Jr. ....... G02F 1/3131
                                                      385/40
4,303,302 A * 12/1981 Ramsey ............... G02B 6/3578
                                                      385/22
(Continued)

FOREIGN PATENT DOCUMENTS

CN          103471746 A       12/2013
CN          107065083 A        8/2017
(Continued)

OTHER PUBLICATIONS

Li et al., "Characterization and Actuation of Ionic Polymer Metal Composites with Various Thicknesses and Lengths", Polymers, 11, 91 (Jan. 2019) (14 pages).
(Continued)

*Primary Examiner* — Kaveh C Kianni
(74) *Attorney, Agent, or Firm* — Tihon Poltavets, Esq.; Kevin P. Radigan, Esq.; Heslin Rothenberg Farley & Mesiti P.C.

(57) ABSTRACT

A fiber-optic switching system is provided which includes an optical fiber switch having first and second optical fiber portions and an electrically-controlled actuator. The first and second optical fiber portions are spaced apart with a gap between the portions that is sized to allow for light signal coupling between the optical fiber portions in a signal-passing state of the switch. The electrically-controlled actuator is coupled to transition the switch between the signal-passing state, where the light signal is allowed to pass between the optical fiber portions, and a signal-non-passing state, where the light signal is prevented from passing between the optical fiber portions. The electrically-controlled actuator includes an electroactive material exhibiting a physical change with change in an applied electrical field, where the physical change facilitates transitioning the opti-
(Continued)

cal fiber switch between the signal-passing and the signal-non-passing states.

14 Claims, 11 Drawing Sheets

(58) Field of Classification Search
USPC .......................................................... 385/76
See application file for complete search history.

(56) References Cited

U.S. PATENT DOCUMENTS

| | | | |
|---|---|---|---|
| 4,304,302 A | 12/1981 | Ramsey et al. | |
| 4,415,228 A * | 11/1983 | Stanley | G02B 6/3504 |
| | | | 310/330 |
| 5,016,957 A * | 5/1991 | Seaver | G01L 1/241 |
| | | | 385/16 |
| 5,095,515 A * | 3/1992 | Seaver | G01L 1/241 |
| | | | 385/16 |
| 5,133,030 A * | 7/1992 | Lee | G02B 6/2817 |
| | | | 385/15 |
| 5,208,880 A * | 5/1993 | Riza | G02B 6/2804 |
| | | | 385/16 |
| 5,281,960 A * | 1/1994 | Dwyer, III | G09G 3/002 |
| | | | 345/31 |
| 5,623,356 A * | 4/1997 | Kaminow | H04Q 11/0005 |
| | | | 398/46 |
| 5,663,818 A * | 9/1997 | Yamamoto | H04Q 11/0001 |
| | | | 398/1 |
| 5,774,604 A | 6/1998 | McDonald | |
| 6,031,946 A * | 2/2000 | Bergmann | G02B 6/266 |
| | | | 385/18 |
| 6,288,808 B1* | 9/2001 | Lee | H04J 14/0223 |
| | | | 398/49 |
| 6,360,033 B1* | 3/2002 | Lee | B81B 3/0054 |
| | | | 359/224.1 |
| 6,404,940 B1* | 6/2002 | Tsuyama | H04Q 11/0005 |
| | | | 385/17 |
| 6,466,343 B1* | 10/2002 | Lahat | H04Q 11/0005 |
| | | | 398/82 |
| 6,519,382 B1* | 2/2003 | Jurbergs | G02B 6/3502 |
| | | | 385/16 |
| 6,583,772 B1* | 6/2003 | Lewis | G02B 27/017 |
| | | | 345/7 |
| 6,636,653 B2* | 10/2003 | Miracky | G02B 6/32 |
| | | | 385/14 |
| 6,636,664 B2* | 10/2003 | Snyder | G02B 6/3524 |
| | | | 385/115 |
| 6,763,191 B1* | 7/2004 | Handelman | H04Q 11/0005 |
| | | | 398/45 |
| 7,149,391 B1* | 12/2006 | El-Sherif | G02F 1/3131 |
| | | | 385/50 |
| 7,551,813 B2 | 6/2009 | Ivtsenkov | |
| 7,676,125 B2* | 3/2010 | Zheng | G02B 6/3588 |
| | | | 385/18 |
| 8,867,883 B2 | 10/2014 | Crain et al. | |
| 9,743,357 B2* | 8/2017 | Tabe | H04W 52/0245 |
| 2002/0021467 A1* | 2/2002 | Ofek | H04L 12/6418 |
| | | | 398/87 |
| 2002/0054728 A1* | 5/2002 | Laor | H02N 2/028 |
| | | | 385/16 |
| 2002/0102064 A1 | 8/2002 | Rosemeier et al. | |
| 2003/0090776 A1* | 5/2003 | Vaganov | G02B 6/266 |
| | | | 359/296 |
| 2003/0128912 A1* | 7/2003 | Dames | G02B 6/3508 |
| | | | 385/17 |
| 2003/0194175 A1* | 10/2003 | Beshai | H04Q 11/0005 |
| | | | 385/24 |
| 2003/0220184 A1* | 11/2003 | Li | C04B 35/499 |
| | | | 501/134 |
| 2004/0184708 A1* | 9/2004 | Ghandi | H04Q 11/0005 |
| | | | 385/16 |
| 2004/0208422 A1* | 10/2004 | Hagood | G02B 6/3504 |
| | | | 385/16 |
| 2004/0247244 A1* | 12/2004 | Bao | G02B 6/29395 |
| | | | 385/39 |
| 2005/0081397 A1* | 4/2005 | Bonham | G02B 6/4226 |
| | | | 33/645 |
| 2005/0090378 A1* | 4/2005 | Li | C04B 35/495 |
| | | | 501/134 |
| 2006/0007514 A1* | 1/2006 | Desai | G02B 26/0833 |
| | | | 359/223.1 |
| 2007/0035800 A1* | 2/2007 | Hochberg | G02F 3/00 |
| | | | 359/237 |
| 2012/0050735 A1* | 3/2012 | Higgins | G01L 1/24 |
| | | | 356/326 |
| 2013/0315542 A1* | 11/2013 | Wyss | G02B 6/381 |
| | | | 385/83 |
| 2015/0178939 A1* | 6/2015 | Bradski | H04N 13/00 |
| | | | 345/633 |
| 2015/0205126 A1* | 7/2015 | Schowengerdt | G02B 6/00 |
| | | | 345/633 |
| 2018/0161935 A1* | 6/2018 | Brown | B22F 3/11 |
| 2018/0212395 A1* | 7/2018 | Kliner | G02F 1/3523 |
| 2018/0214980 A1* | 8/2018 | Gross | B23K 26/073 |
| 2018/0215650 A1* | 8/2018 | Brown | C03B 40/00 |
| 2018/0217411 A1* | 8/2018 | Karlsen | G02F 1/0115 |
| 2019/0339458 A1 | 11/2019 | Pimpinella | |

FOREIGN PATENT DOCUMENTS

| | | |
|---|---|---|
| DE | 19720619 C2 | 1/2001 |
| WO | WO 2019/061889 A1 | 4/2019 |

OTHER PUBLICATIONS

"Fiber Optics: How Fused Fiber Optic Couplers Work", Photonics Technical Note #25, Fiber Optics, https://www.newport.com/medias/sys_master/images/images/h86/hb2/8797287088158/Tech-Note-26-How-Fused-Fiber-Optic-Couplers-Work.pdf, downloaded Feb. 13, 2020 (4 pages).

DCC Cables, Online Brochure, http://www.dcc-cables.com/htmls/page_949.aspx?c0-14775&bsp-14772a, downloaded Feb. 13, 2020 (2 pages).

Paschotta, Rudiger, RP Photonics Encyclopedia, "Fiber Couplers", https://www.rp-photonics.com/fiber_couplers.html, downloaded Feb. 13, 2020 (6 pages).

Wikipedia, "Electroactive Polymers", https://www.wikipedia.org/wiki/Electroactive_polymers, downloaded Feb. 13, 2020 (11 pages).

Wikipedia, "Ionic Polymer-Metal Composites", https://en.wikipedia.org/wicki/Ionic_polymer-metal_composites, downloaded Feb. 13, 2020 (3 pages).

* cited by examiner

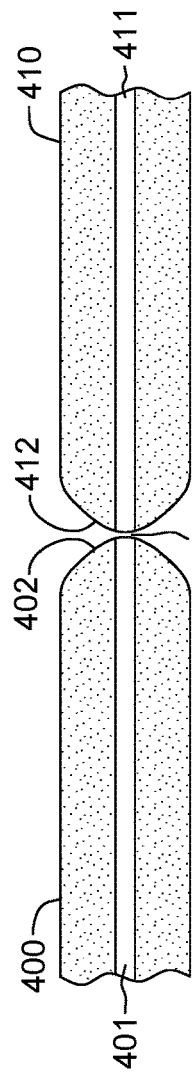
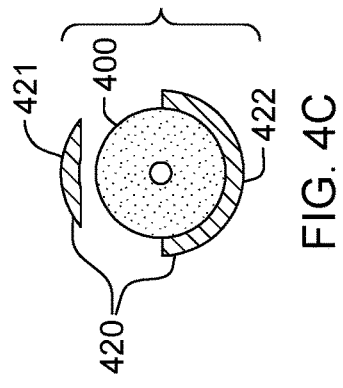
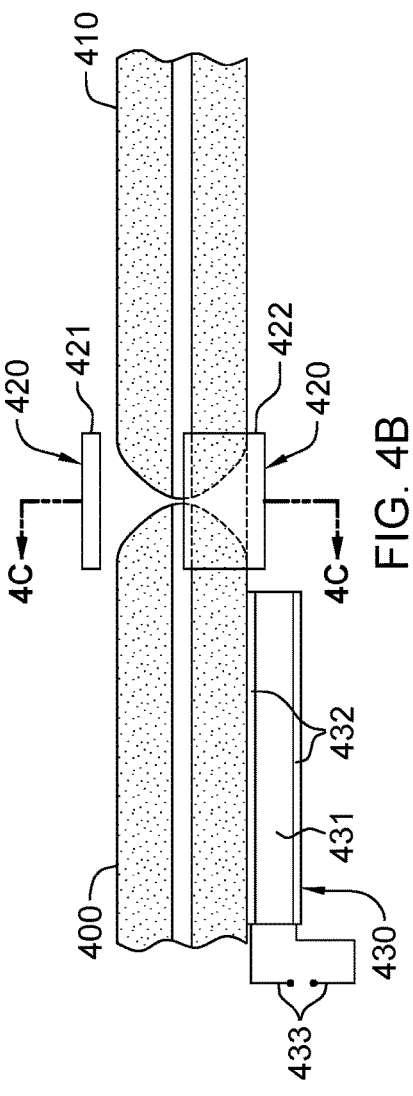
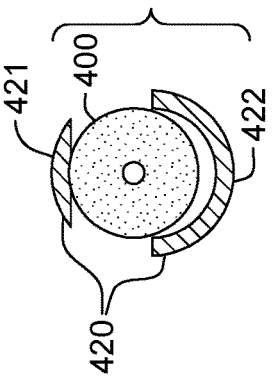
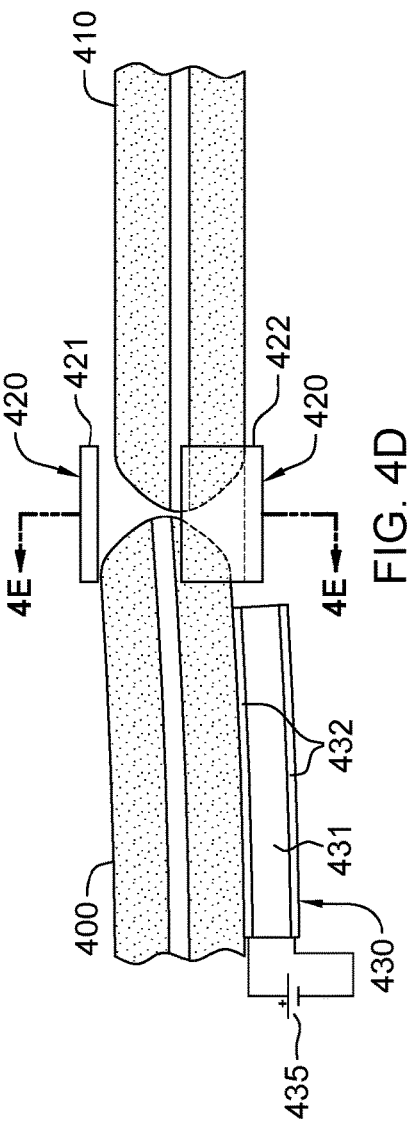

ELECTRICALLY-CONTROLLED FIBER-OPTIC SWITCHING SYSTEM

BACKGROUND

Multi-fiber, push-on (MPO) terminated cables can be used with fiber breakouts to facilitate optical fiber measurements of a multi-fiber optical cable, such as a multi-fiber optical transceiver. MPO-terminated cables are widely used in high density cabling environments, such as data centers, with an MPO connector being commonly used to terminate multi-fiber ribbon connections. Conventionally, when performing optical test measurements on a multi-fiber optical cable, such as a multi-fiber optical ribbon cable, there is need for an operator to physically, optically connect and disconnect each respective optical fiber breakout path of the cable being tested or measured, for instance, for optical characteristic verification.

SUMMARY

Certain shortcomings of the prior art are overcome and additional advantages are provided through the provision, in one or more aspects, of a fiber-optic switching system which includes an optical fiber switch having first and second optical fiber portions and an electrically-controlled actuator. The first optical fiber portion and second optical fiber portion are spaced apart with a gap therebetween, with the gap being sized to allow for light signal coupling between the first and second optical fiber portions in a signal-passing state of the optical fiber switch. The electrically-controlled actuator is coupled to transition the optical fiber switch between the signal-passing state, where the light signal is allowed to pass between the first and second optical fiber portions of the optical fiber switch, and a signal-non-passing state, where the light signal is prevented from passing between the first and second optical fiber portions of the optical fiber switch. The electrically-controlled actuator includes an electroactive material exhibiting a physical change with change in an applied electric field, where the physical change facilitates transitioning the optical fiber switch between the signal-passing and the signal-non-passing states.

In another aspect, a fiber-optic switching system is provided which includes multiple optical fiber switches and a fiber-optic coupler assembly. A selected optical fiber switch of the multiple optical fiber switches includes a first optical fiber portion and a second optical fiber portion, and an electrically-controlled actuator. The first and second optical fiber portions have a gap therebetween, which is sized to allow for light signal coupling between the first and second optical fiber portions in a signal-passing state of the selected optical fiber switch. The electrically-controlled actuator is coupled to transition the selected optical fiber switch of the multiple optical fiber switches between the signal-passing state, where the light signal is allowed to pass between the first and second optical fiber portions of the selected optical fiber switch, and a signal-non-passing state, where the light signal is prevented from passing between the first and second optical fiber portions of the selected optical fiber switch. The electrically-controlled actuator includes an electroactive material exhibiting a physical change with change in an applied electric field. The physical change facilitates transitioning the selected optical fiber switch between the signal-passing and the signal-non-passing states. The fiber optic coupler assembly couples the multiple optical fiber switches in optical communication with a fiber-optic output of the fiber-optic switching system. The electrically-controlled actuator selectively allows the light signal to pass through the selected optical fiber switch, for passage through the fiber-optic coupler assembly, to the fiber-optic output of the fiber-optic switching system.

In a further aspect, a method of fabricating a fiber optic switching system is provided. The method includes fabricating an optical fiber switch, including providing a first optical fiber portion and a second optical fiber portion spaced apart with a gap therebetween. The gap is sized to allow for light signal coupling between the first and second optical fiber portions in a signal-passing state of the optical fiber switch. The fabricating further includes providing an electrically-controlled actuator to transition the optical fiber switch between the signal-passing state, where the light signal is allowed to pass between the first and second optical fiber portions of the optical fiber switch, and a signal-non-passing state, where the light signal is prevented from passing between the first and second optical fiber portions of the optical fiber switch. The electrically-controlled actuator includes an electroactive material exhibiting a physical change with change in an applied electric field, where the physical change facilitates transitioning of the optical fiber switch between the signal-passing and the signal-non-passing states.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4A depicts another embodiment of first and second optical fiber portions of an optical fiber switch for a fiber-optic switching system, in accordance with one or more aspects of the present invention;

FIG. 4B depicts an optical fiber switch with the first and second optical fiber portions of FIG. 4A, and an electrically-controlled actuator, and with the optical fiber switch shown in a signal-passing state to allow a light signal to pass between the first and second optical fiber portions, in accordance with one or more aspects of the present invention;

FIG. 4C is a cross-sectional elevational view of the optical fiber switch of FIG. 4B, taken along line 4C-4C thereof, in accordance with one or more aspects of the present invention;

FIG. 4D depicts the optical fiber switch of FIGS. 4B & 4C, with the electrically-controlled actuator having transitioned the optical fiber switch to a signal-non-passing state, where the light signal is prevented from passing between the first and second optical fiber portions, in accordance with one or more aspects of the present invention;

FIG. 4E is a cross-sectional elevational view of the optical fiber switch of FIG. 4D, taken along line 4E-4E thereof, in accordance with one or more aspects of the present invention;

DETAILED DESCRIPTION

Figure 1A:
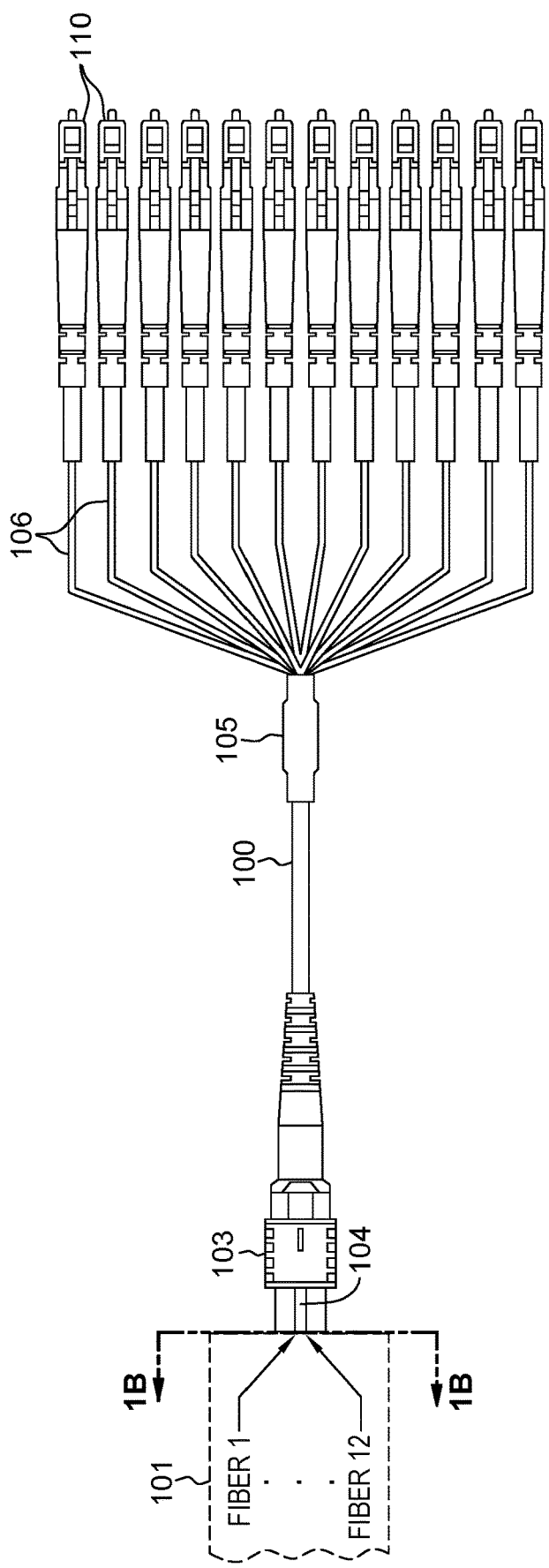
FIG. 1A depicts one embodiment of a multi-fiber optical cable coupled to a fan-out test cable for facilitating optical testing of the optical cable, and which can couple to a fiber-optic switching system, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of the concepts disclosed herein.

Optical fibers are flexible, transparent fibers made of glass or plastic that are used to transmit light between two ends. Optical fibers are used in a wide variety of communication and computing environments, where they permit transmission of signals or data over long distances at high bandwidths. Advantageously, signals can travel along optical fibers with less loss than electrical signals along electrical wires, and fiber-optics are immune to electromagnetic interference.

As known, optical fibers typically include a core surrounded by a transparent cladding material, with a low index of refraction. In operation, the fiber acts as a waveguide. Fibers that support many propagation paths or transverse modes are referred to as multi-mode fibers, and those that support a single mode are referred to as single-mode fibers. Multi-mode fibers generally have a wider core diameter, and are used for shorter distance communication lengths, such as for applications where higher power is to be transmitted.

A wide variety of fiber-optic cable types are available. One type, referred to as a ribbon fiber-optic cable, is formed into a flat strip by manufacturing a series of individual optical fibers, laying them flat, and bonding them together. Using this technology, 12 or 24 optical fibers are often be bundled together today. Whenever an installer has an application with a tight installation space, as in the case with many data centers, this type of optical cable can be one of the solutions. Oftentimes, ribbon fiber-optic cabling is terminated with a multi-fiber, push-on (MPO) connector. An MPO-terminated optical cable is an MPO cable, which carries multiple fibers and is provided pre-terminated. Factory terminated MPO connectors commonly have 12-fiber or 24-fiber arrays today.

More generally, multi-fiber, or multi-core, optical cables have a common cladding layer with more than one fiber core. Commonly used multi-fiber optic cables include 4, 6, 8, 12 & 24-core cables, which as noted, can be configured as optical ribbon cables terminated by an MPO connector at each end.

To perform an optical test, such as optical power test measurements on a multi-fiber-optic cable, there is a need for an operator to physically connect and disconnect to a measurement or test system each respective optical fiber path of the cable to be tested/measured. To facilitate this testing, the multi-fiber, MPO-terminated optical cable is often used with a fan-out test cable to provide individual fiber breakout for optical power measurements. The process still requires, however, each fiber to be individually connected and disconnected to the measurement or test system by a technician. Disclosed herein are fiber-optic switching systems that can be used in association with a fan-out test cable to facilitate optical testing and measurement of multi-fiber optical cables, without requiring the technician to continually switch between optical fiber connections.

Briefly, fiber-optic testing is used to evaluate fiber-optic cabling and components to confirm that their performance is within specification. Designers of fiber-optic cable networks depend on the specifications to determine if the network will work for the planned application. Fiber-optic testing and/or measurement is typically performed during install of the cabling infrastructure, or during debug of an installed cabling infrastructure. For instance, for each optical fiber cable of a cabling infrastructure, there is a need to test for continuity and polarity, end-to-end insertion loss, and to troubleshoot any issues.

Testing is a subject of many industry standards, as there is a need to verify component and system specifications in a consistent manner. One of the more significant tests is for insertion loss of an installed fiber-optic cable infrastructure. Insertion loss can be performed with a light source and a power meter, or optical loss test set, which is required by all international standards to ensure that the cabling infrastructure is within a loss budget before acceptance of an installation. Testing fiber-optics often requires tools and instruments which are chosen based on the components or optical fibers being tested. Practically every measurement in fiber-optics refers to optical power measured in dB. Measuring power of a single optical fiber might require only a power meter, and network electronics to turn on a transmitter. To measure power, a meter needs to be attached to the fiber-optic cable that is attached to the source that has the output to be measured. The test might be performed at the receiver to measure received power.

Loss of a cable is the difference between the power coupled to the cable at the transmitter end and what is measured at the receiver end. Testing for loss, also referred to as "insertion loss", requires measuring the optical power lost in a fiber-optic cable, including fiber attenuation, connector loss, splice loss, etc., with a fiber-optic light source and power meter (or optical loss test set). Loss testing is typically performed at wavelengths appropriate for the fiber and its usage. Generally, multi-mode fibers test at 850 nm, and optionally at 1300 nm, with LED sources. Single-mode fibers are tested at 1310 nm, and commonly at 1550 nm, with laser sources.

Figure 1B:
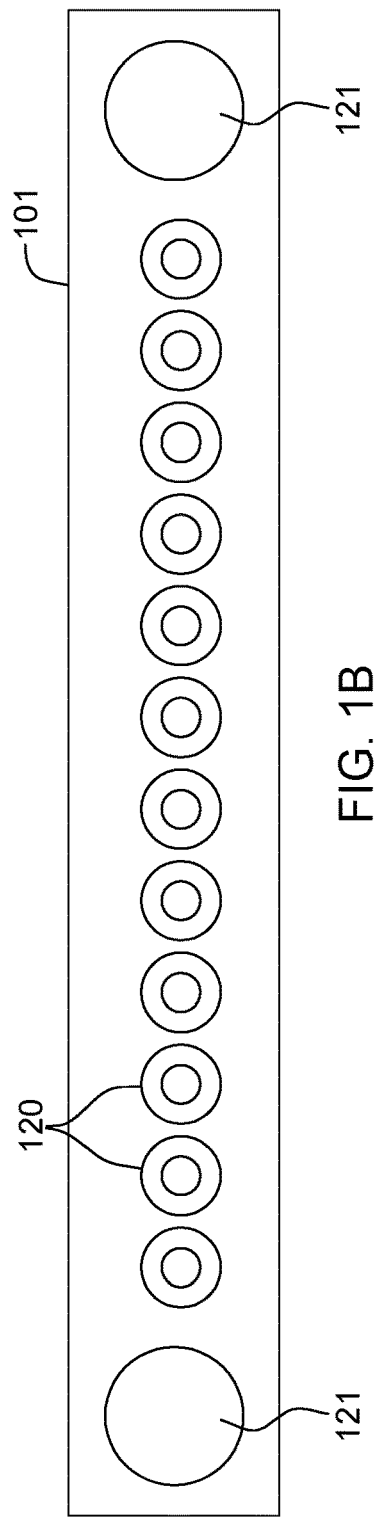
FIG. 1B depicts one embodiment of a multi-fiber, push-on (MPO) transceiver connector of a multi-fiber optical cable to be tested using, in part, a fiber-optic switching system, in accordance with one or more aspects of the present invention.

Testing multi-mode optical cables presents the further issue of breaking out the individual fibers for test/measurement. FIG. 1A depicts one embodiment of a fan-out test cable 100 to facilitate this process. In FIG. 1A, a multi-fiber optical cable 101 (shown with fibers 1 . . . 12, by way of example only) is, for instance, an MPO-terminated optical cable. FIG. 1B depicts one embodiment of the MPO-terminated optical cable 101, which is shown to include multiple (e.g., 12) individual fibers 120, along with alignment pins/sockets 121. Note that although described herein with reference to a 12-core optical cable, the concepts disclosed are applicable to any number of optical fibers or optical fiber cores.

As illustrated in FIG. 1A, the MPO-terminated, multi-fiber optical cable 101 couples to an MPO fiber connector 103 of fan-out test cable 100, which can include a polarity key 104 to facilitate proper connection. A splitter or fan-out connector 105 separates the individual cores into respective optical fibers 106, which can be, for instance, 2.0 mm optical fiber tubes, each of which includes a respective optical connector 110, such as a respective LC/ST connector (i.e., a respective small form factor (LC) or straight tip (ST) connector).

One approach to performing optical testing, such as optical power test measurements, on multi-fiber optical cable 101 using fan-out test cable 100, is for a technician to clean the MPO connectors, connect the multi-fiber optical cable to the fan-out test cable, select an optical fiber 106, clean the selected optical fiber, check that the optical fiber selected is clean, manually connect the selected optical fiber to the measurement or test equipment, take the measurement, unplug the selected fiber, select a next optical fiber 106 of the fan-out test cable, and repeat the process until all optical fibers of the fan-out test cable have been connected to the measurement or test equipment, and the measurements performed. In the case of a 12-fiber optical cable, this manual process must be repeated 12 times at a minimum. Note that, in many cases, it may be necessary to clean an optical fiber connection more than once during the process. The above-noted, manual test process is thus time-consuming, requiring cleaning of each optical fiber before each connect operation, and is prone to contamination due to the number of connections and disconnections. Further, there is the possibility for human error due to the technician's repeated connecting and disconnecting of connectors to the measurement or test equipment. In addition, the technician must be present during the entire test process. Also, in practice, there is a limited number of plug cycles of connectors to the test system due to, for instance, mechanical wear of the connectors and/or the test system connector receptacles.

Advantageously, the fiber-optic switching systems disclosed herein significantly reduce the need for continued technician handling of the fiber connectors when testing a multi-fiber-optical cable. Rather than an operator being required to repetitively connect and disconnect the individual test cable connectors to the measurement or test equipment to obtain test measurements for each fiber of the multi-fiber-optical cable, switching is automated using electrically-controlled optical switches that perform the individual selection of a particular fiber or path to be tested. In accordance with one or more aspects of the present invention, once a configuration is connected and initialized, the separate testing and/or measuring of optical signal strength on the respective fiber cores is performed automatically by, for instance, a system controller.

Figure 2A:
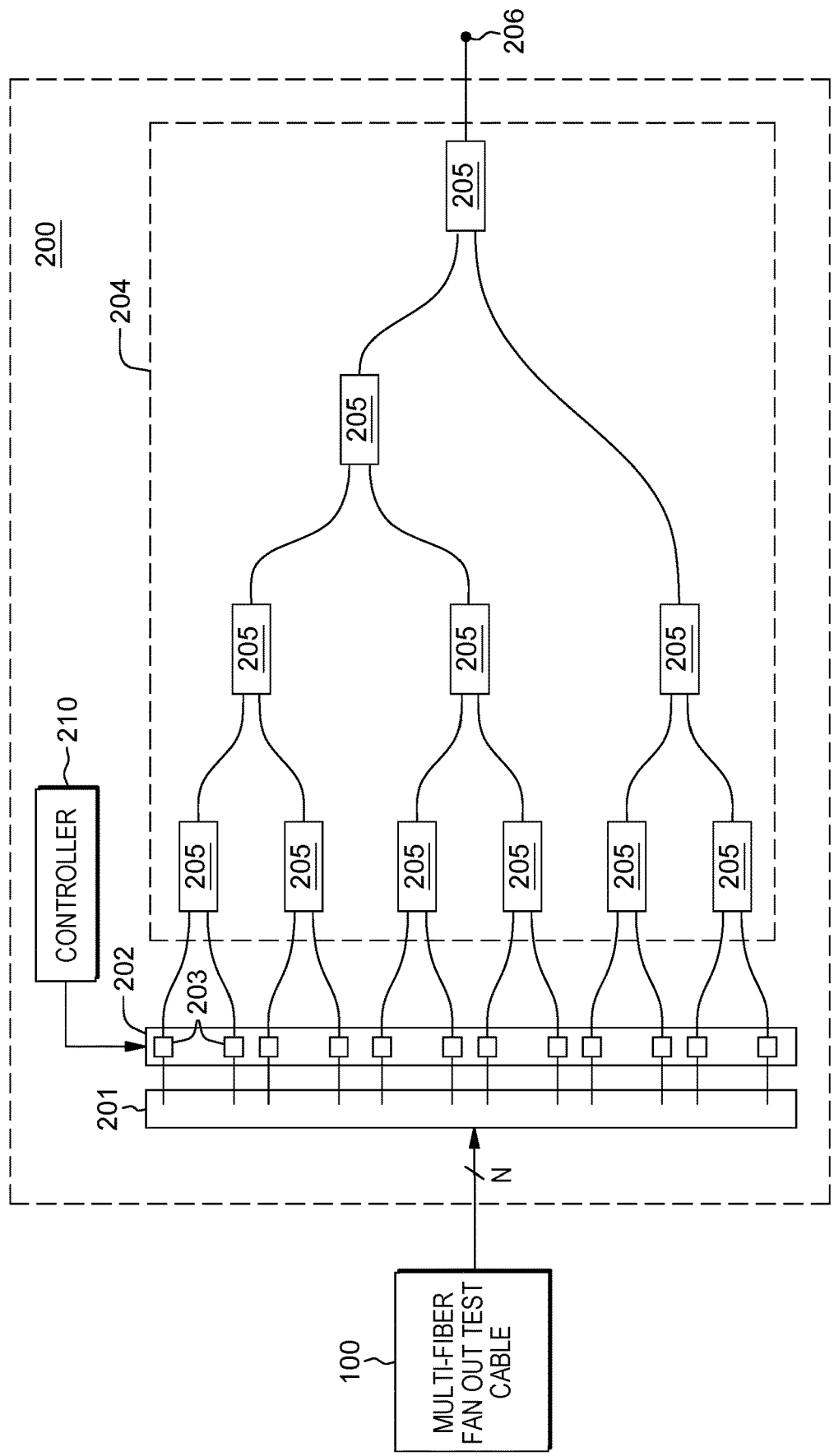
FIG. 2A depicts one embodiment of a fan-out test cable coupled to a fiber-optic switching system, in accordance with one or more aspects of the present invention.

FIG. 2A depicts one embodiment of a fiber-optic switching system 200, in accordance with one or more aspects of the present invention. In this implementation, a multi-fiber fan-out test cable 100, such as illustrated in FIG. 1A, has N distinct fiber core or path connections to an input 201 of fiber-optic switching system 200, where N is, for instance, 4, 6, 8, 12, 24, etc., connections.

In the embodiment illustrated, fiber-optic switching system 200 further includes a switching assembly 202 with multiple optical fiber switches 203, each of which is associated with a respective optical fiber path of the N optical fiber paths plugged to input connector 201. As described herein, optical fiber switches 203 are separately controlled to selectively transition the respective optical signal path between signal-passing and signal-non-passing states. In one or more implementations, optical switches 203 are separately controlled by a controller 210, such as a micro-controller or computer system control, such as described below with reference to FIG. 8.

In one or more embodiments, each optical fiber switch 203 includes a respective first optical fiber portion and a second optical fiber portion spaced apart with a gap between the portions. The gap is sized to allow for light signal coupling between the first and second optical fiber portions in a signal-passing state of the optical fiber switch. Further, each optical fiber switch includes an electrically-controlled actuator coupled to transition the optical fiber switch between the signal-passing state, where a light signal is allowed to pass between the first and second optical fiber portions of that optical fiber switch, and a signal-non-passing state, where the light signal is prevented from passing between the first and second optical fiber portions of the optical fiber switch. Further, in one or more implementations, one or more of the electrically-controlled actuators include an electroactive material exhibiting a physical change with change in an applied electric field. The electroactive material is configured and positioned so that the physical change facilitates transitioning the respective optical fiber switch between the signal-passing and signal-non-passing states.

In one or more embodiments, the first optical fiber portions of optical fiber switches 203 are optically connected via input 201 to a respective fiber core of the Nfiber cores, and the associated second optical fiber portions are optically connected to a fiber-optic coupler assembly 204. As illustrated, fiber-optic coupler assembly 204 includes (in one embodiment) multiple fiber-optic couplers 205 hierarchically configured to transition from the N fiber cores to a single fiber-optic output 206. In one or more embodiments, fiber-optic output 206 can be connected to, or configured to connect to, the measurement or test system/equipment, to facilitate the desired testing of the individual fiber-optic cores of the multi-fiber optical cable.

Figure 2B:
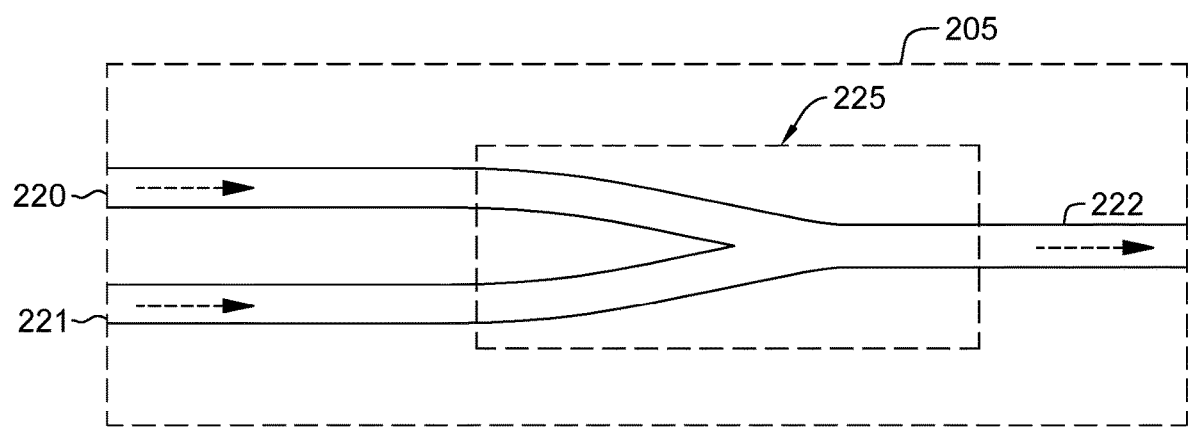
FIG. 2B depicts one embodiment of a fiber-optic coupler of the fiber-optic switching system of FIG. 2A, in accordance with one or more aspects of the present invention.

FIG. 2B depicts one embodiment of fiber-optic coupler 205 of fiber-optic coupler assembly 204. As illustrated, fiber-optic coupler 205 is configured to merge two optical fiber portions 220, 221 into a single optical fiber portion 222. FIG. 2B thus depicts one example of a Y-fiber coupler or combiner, which as understood by one skilled in the art, accomplishes coupling of the fiber-optic paths and signals by merging the fiber-optic cores together, and tapering down the cladding in a combiner region 225 of the fiber-optic coupler 205. Note that fiber-optic coupler 205 of FIG. 2B is provided by way of example only.

As noted, in addition to the first and second optical fiber portions, an optical fiber switch 203 (FIG. 2A) also includes an electrically-controlled actuator, such as an electro-mechanical actuator mechanism. By using electrically-controlled actuators, optical fiber switches 203 are electrically controllable, such as, for instance, by controller 210. In one or more implementations, the electrical control is achieved using electroactive material as part of the electrically-controlled actuators. The electroactive material is selected to exhibit a physical change with change in an applied electric field, and the physical change in the electroactive material is configured to be sufficient to facilitate transitioning of the respective optical fiber switch between the signal-passing and signal-non-passing states, as explained further below. In one or more embodiments, the electroactive material is, or includes, an electroactive polymer (EAP) that is configured and sized to exhibit a desired physical change with change in the applied electric field.

With a fiber-optic switching system such as depicted in FIGS. 2A-2B, a controller or control system can implement automated breakout of the individual optical fibers being tested. In operation, a fiber-optic switching system such as disclosed herein can be used by a technician cleaning the MPO connectors, and connecting the MPO connectors to connect the multi-fiber optical cable and the fan-out test cable. Further, the individual test cable connectors 106 (FIG. 1A) are cleaned and connected to the fiber-optic switching system 200 (FIG. 2A), which itself is connected to (or part of) the measurement or test system. Once connected, testing occurs automatically by computer control of the optical fiber switches in a desired sequence, and taking measurements of, for instance, signal strength through the selected optical fiber switch at the fiber-optic output 206 (FIG. 2A). Advantageously, using a fiber-optic switching system such as disclosed herein, means that there is only one plug and unplug to the fiber-optic switching system, and the technician can leave the system to process the optical fiber signals automatically. Further, this automated testing of optical fibers can be useful where it is desirable to evaluate trends in the strength of optical signals, for instance, by letting the multi-fiber optical cable stay connected to the measurement or test system, via the multi-fiber test cable and fiber-optic switching system, over a long period of time, with the system periodically testing signal strength on the individual fiber-optic cores.

Disclosed herein are fiber-optic switching systems with optical fiber switches that utilize electrically-controlled actuators based on deflection or blockage, and that have reduced losses compared to prior solutions. For instance, micro-electro-mechanical system (MEMS) optical switches are one of the technologies currently in use for optical cross-connect switching. These switches have complex moveable mechanical structures, micro-actuators, and micro-optics, which consume energy and introduce signal loss by having, for instance, extra optical components in the signal path. Other types of optical switches (such as opto-electrical, liquid crystals, etc.) are based on a changing refractive index or material absorption, and thus, exhibit lower extinction ratios. Further, these other solutions can introduce attenuation, depending on the implementation.

As noted herein, the optical fiber switches of the fiber-optic switching system disclosed advantageously utilize electrically-controlled actuators configured with an electroactive material that exhibits a physical change with change in applied electric field. The electroactive material is configured and positioned so that the physical change in the electroactive material in turn facilitates transitioning of the respective fiber-optic switch between signal-passing and signal-non-passing states. In one or more embodiments, the electroactive material includes an electroactive polymer (EAP) sized and configured to exhibit the desired physical change with the change in applied electric field.

FIGS. 3A-3D depict embodiments of optical fiber portions which can be used within an optical fiber switch, in accordance with one or more aspects of the present invention.

Figure 3A:
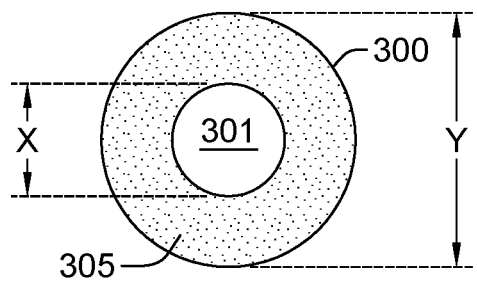
FIG. 3A is a cross-sectional elevational view of one embodiment of an optical fiber portion of an optical fiber switch, in accordance with one or more aspects of the present invention.

In FIG. 3A, an optical fiber portion 300 is shown to include a core 301 with a cladding 305. In one embodiment, core 301 has a core diameter X that might be, for instance, 9 μm for a single-mode fiber, 50 μm for a multi-mode fiber, and 980 μm for a POF fiber, with the diameter Y of the optical fiber being approximately 125 μm for a single-mode fiber or multi-mode fiber, and 1000 μm for a POF fiber. Note that the concepts disclosed herein can be used with a variety of types of optical fibers, such as the noted single-mode fibers, multi-mode fibers or POF fibers.

Figure 3B:
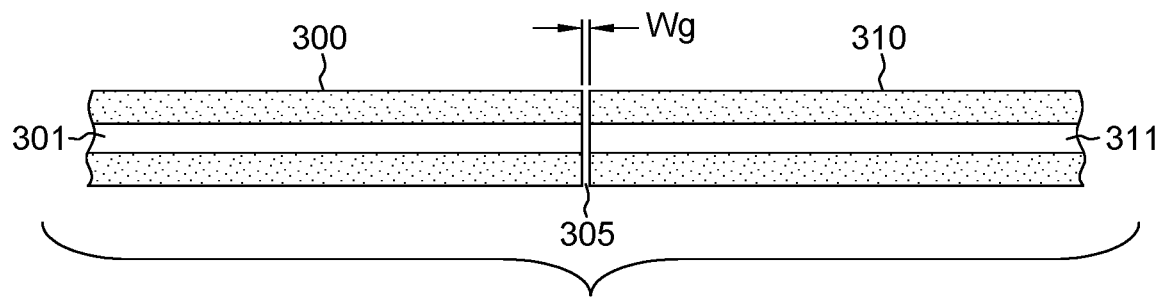
FIG. 3B depicts one embodiment of first and second optical fiber portions of an optical fiber switch, in accordance with one or more aspects of the present invention.

In FIG. 3B, a first optical fiber portion 300 and a second optical fiber portion 310 of an optical fiber switch are shown, each of which has a respective fiber-optic core 301, 311. The first and second optical fiber portions are spaced apart with a gap 305 therebetween, with gap 305 being sized with a width Wg to allow for light signal coupling between the first and second optical fiber portions 300, 310 in a signal-passing state of the optical fiber switch.

Figure 3C:
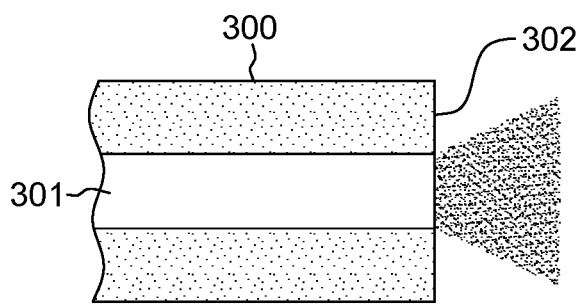
FIG. 3C depicts one embodiment of an optical fiber portion tip for an optical fiber switch, in accordance with one or more aspects of the present invention.
Figure 3D:
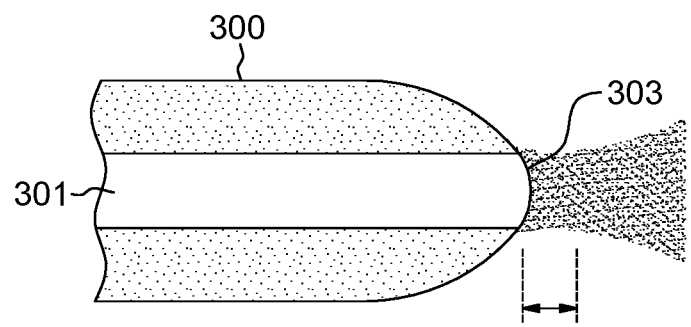
FIG. 3D depicts another embodiment of an optical fiber portion tip for an optical fiber switch, in accordance with one or more aspects of the present invention.

As illustrated in FIG. 3C, in one embodiment, a flat, cleaved fiber tip 302 could be used, for instance, at one of the opposing ends of first and second optical fiber portions 300, 310, or a curved or convex tip 303 (i.e., a lensed tip) such as illustrated in FIG. 3D, can be used at one or both ends of the opposing fiber-optic portions. A flat, cleaved tip is less advantageous for the first and second optical fiber portions due to light-divergence out of the fiber. To allow for efficient light coupling between the optical fiber portions, a curved or convex fiber (i.e., lensed tip), such as depicted in FIG. 3D, can be used. For a typical multi-mode fiber core size of 62.5 µm, and a typical numerical aperture (NA) of 0.3, the maximum working distance for a gap Wg between the first and second optical fiber portions with lensed tips (FIG. 3D), is about 30 µm. By placing the tips of the fiber-optic portions at or within the maximum working distance, good optical coupling is achieved from first optical fiber portion 300 to second optical fiber portion 310, that is, assuming that the optical fibers are aligned, as illustrated in FIG. 3B. Note that, although described herein with reference to optical signal strength measurement and propagation from the input 201 (FIG. 2A) to fiber-optic output 206, the same fiber-optic switching system can also be used to propagate a signal from fiber-optic output 206 in the opposite direction, back through one or more of the optical fiber switches 203, to the fan-out test cable 100, and hence, to the multi-fiber optical cable connected to the fan-out test cable.

By way of further explanation, FIGS. 4A-5C depict switch embodiments with electrically-controlled actuators that physically align or offset the optical fiber portions of the optical fiber switch relative to each other, to transition the switch between signal-passing and signal-non-passing states. In an alternate approach, FIGS. 6A-7B depict switch embodiments with an electrically-controlled actuator that interfaces with a movable opaque member that selectively, physically blocks light coupling between aligned first and second optical fiber portions of the optical fiber switch. This movable opaque member approach can advantageously be used in association with testing of multi-mode optical fibers.

Referring first to the embodiment of FIGS. 4A-4E, an optical fiber switch is partially depicted in FIG. 4A, and is shown to include a first optical fiber portion 400 and a second optical fiber portion 410 spaced apart with a gap 405 between the optical fiber portions. The first and second optical fiber portions 400, 410 include respective fiber-optic cores 401, 411, and in this embodiment, the opposing ends of the first and second optical fiber portions 400, 410 are each curved, with a substantially convex configuration to provide a lensed tip at each fiber-optic portion.

FIGS. 4B & 4C depict the optical fiber switch of FIG. 4A, with an electrically-controlled actuator 430 shown physically coupled to first optical fiber portion 400, and with an alignment/limiting structure 420 provided which includes, in one embodiment, an upper vertical limiter 421, and a lower alignment guide/limiter 422, which are attached in fixed position within the system to guide and limit movement of the fiber optic portion(s). Note in this regard, that although shown in connection with first optical fiber portion 400, electrically-controlled actuator 430 could, in one or more other embodiments, be coupled to second optical fiber portion 410. Further, in one or more other embodiments, each optical fiber portion 400, 410, could have an associated electrically-controlled actuator, if desired for a particular application.

In the embodiment of FIGS. 4B & 4C, the optical fiber switch is depicted in signal-passing state, with the first optical fiber portion and second optical fiber portion aligned. In the depicted embodiment, the electrically-controlled actuator 430 has no signal applied between terminals 433, which connect to upper and lower plates 432, between which the electroactive material 431 (e.g., electroactive polymer) is located.

As known, electroactive polymers are polymers that exhibit a change in shape or size when activated by an electric field. This characteristic is advantageously employed herein by appropriately sizing and configuring the electroactive material 431 to affect the desired movement of the associated optical fiber portion when there is a change in the applied electric field across the electroactive material 431. In one or more implementations, the electroactive polymer can be an ionic polymer-metal composite (IPMC), which is a synthetic composite nanomaterial. An IPMC includes an ionic polymer whose surfaces are chemically plated or physically coated with a conductor, such as platinum or gold. Under applied voltage of, for instance, 1-5 volts for a typical 10 mm×40 mm×0.2 mm sample, ion migration and redistribution due to the imposed voltage across the strip of IPMC, results in a bending deformation. If the plate electrodes are arranged in a non-symmetric configuration, the imposed voltage can induce various types of deformation, such as twisting, rolling, turning, etc., which can advantageously be used if desired, depending on the implementation.

In FIGS. 4D & 4E, a voltage 435 is applied across plates 432, resulting in a change in applied electric field across electroactive material 431, which causes the electroactive material to physically change shape in a pre-defined manner, causing movement of first optical fiber portion 400 into contact with upper vertical limiter 421, resulting in misalignment of the first and second optical fiber portions, and transitioning the optical fiber switch from the signal-passing state of FIGS. 4B & 4C to a signal-non-passing state. In one or more embodiments, the movement of the first optical fiber portion 400 is sufficient to misalign the first fiber-optic core and the second fiber-optic core by a distance sufficient to eliminate coupling of light from first optical fiber portion 400 to second optical fiber portion 410. For instance, the movement of the first optical fiber portion 400 is, in one or more embodiments, sufficient to misalign the first fiber-optic core portion and the second fiber-optic core portion by the radius of the cladding of the second optical fiber portion 410, or more. For instance, in one or more embodiments, 125-150 µm displacement can be sufficient to transition the optical fiber switch from the signal-passing state to the signal-non-passing state.

Those skilled in the art will note from this description that various configurations of the optical fiber switch disclosed are possible. For instance, in one or more other embodiments, the optical fiber switch can be in the signal-non-passing state when no voltage is applied, and can be transitioned to the signal-passing state when voltage is applied.

Figure 5A:
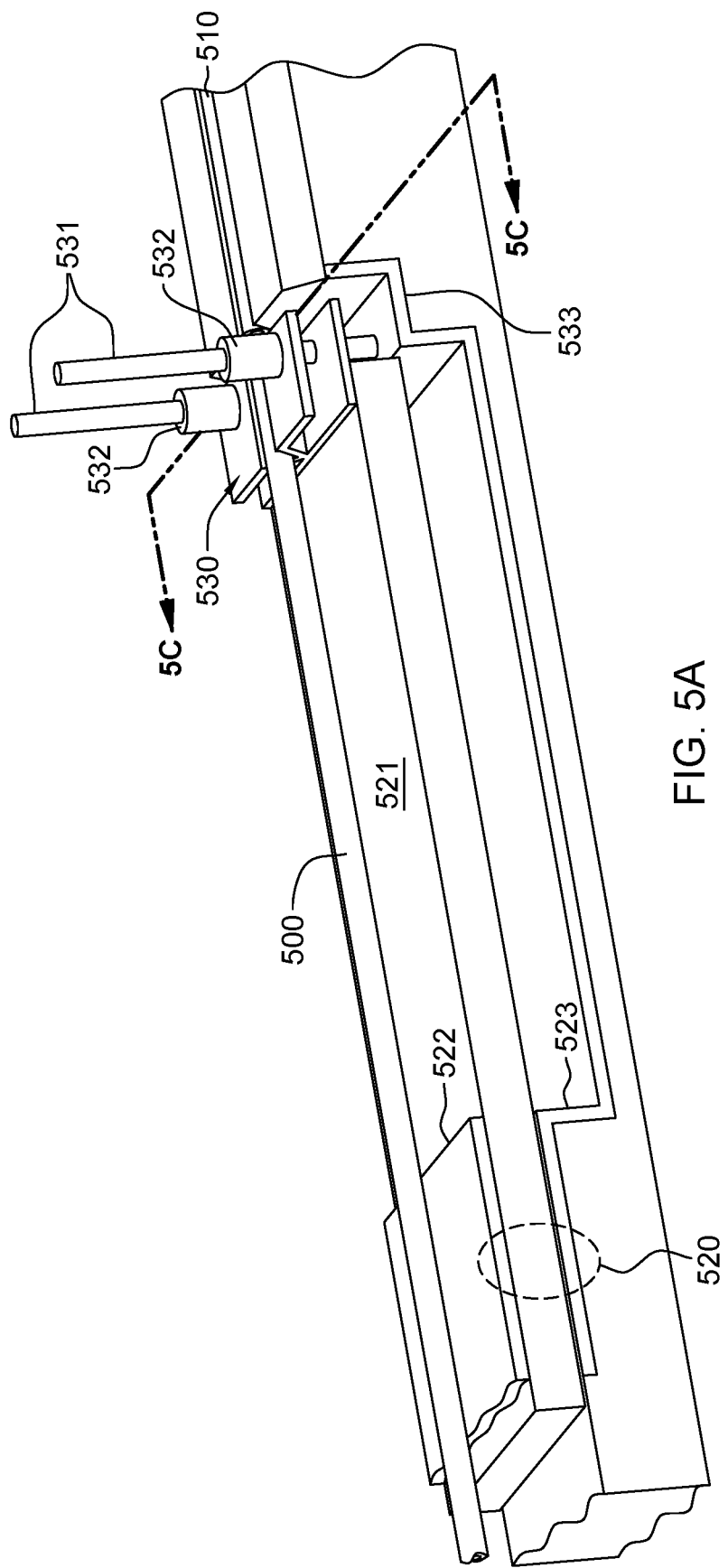
FIG. 5A depicts a further embodiment of an optical fiber switch, with the optical fiber switch shown in a signal-passing state, in accordance with one or more aspects of the present invention.
Figure 5B:
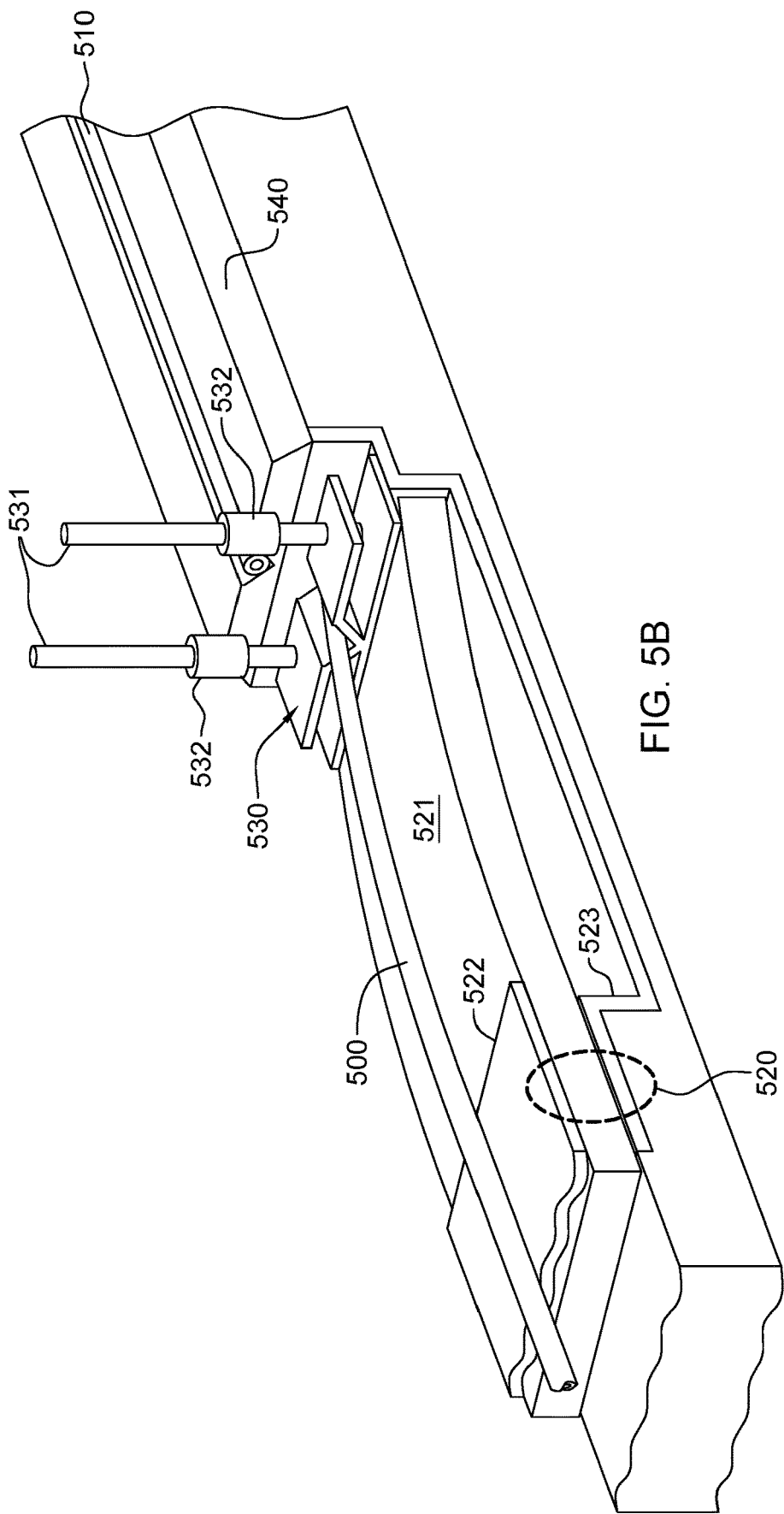
FIG. 5B depicts the optical fiber switch of FIG. 5A, with the optical fiber switch shown in a signal-non-passing state, in accordance with one or more aspects of the present invention.
Figure 5C:
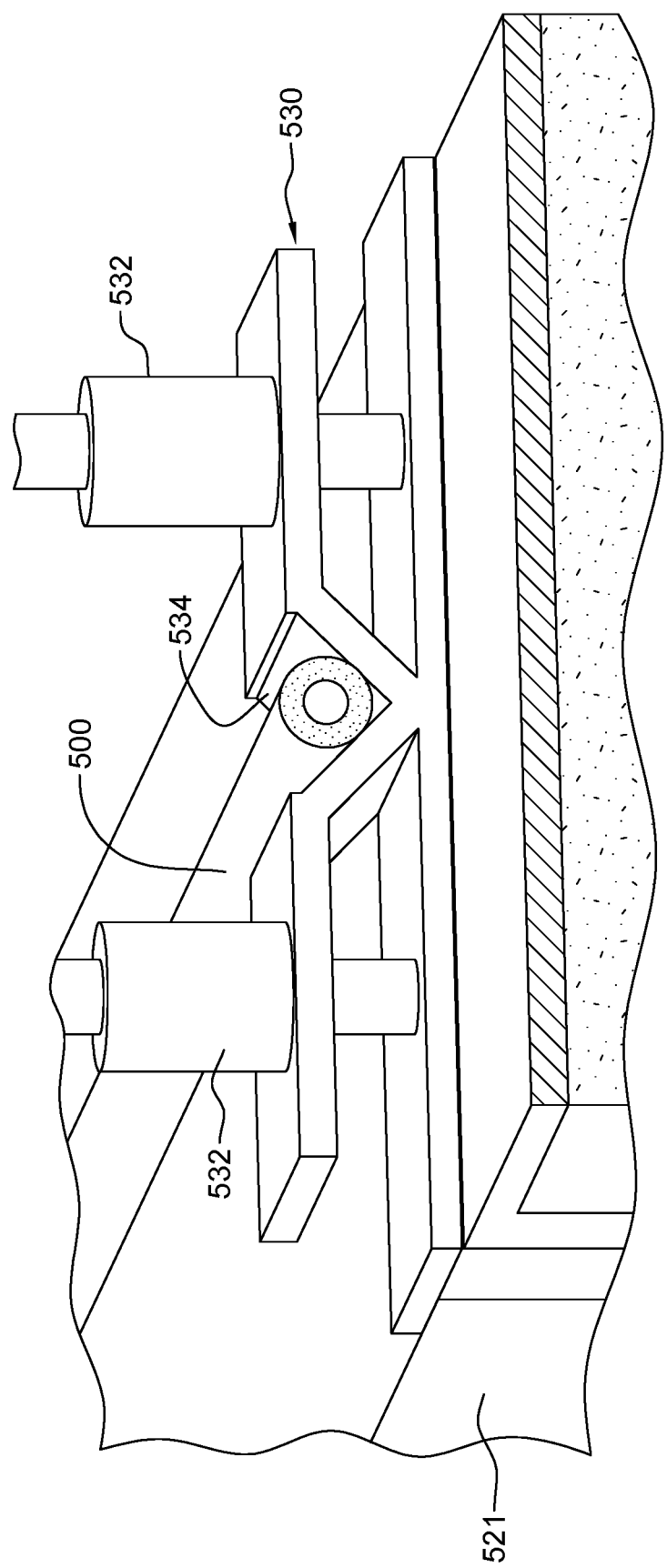
FIG. 5C is a partial elevational view of the optical fiber switch of FIG. 5A, taken along line 5C-5C thereof, in accordance with one or more aspects of the present invention.

FIGS. 5A-5C depict a further embodiment of an optical fiber switch of a fiber-optic switching system, such as disclosed herein. Referring collectively to FIGS. 5A-5C, the optical fiber switch again includes a first optical fiber portion 500 and a second optical fiber portion 510, spaced apart with a gap therebetween. The gap is sized to allow for light signal coupling between the first and second optical fiber portions 500, 510 in a signal-passing state of the optical fiber switch, with the optical fiber switch being shown in signal-passing state in FIG. 5A. In this embodiment, an electrically-controlled actuator 520 is coupled to first optical fiber portion 500 to transition the optical fiber switch between the signal-passing state, where the light signal is allowed to pass between the first and second optical fiber portions 500, 510, and a signal-non-passing state, where the light signal is prevented from passing between the first and second optical fiber portions 500, 510. Electrically-controlled actuator 520 includes an electroactive material 521 which exhibits a physical change with change in an applied electrical field.

The physical field facilitates transitioning the optical fiber switch between the signal-passing and the signal-non-passing states.

In one embodiment, the electroactive material is an electroactive polymer, such as the above-noted ionic polymer-metal composite. In the embodiment of FIGS. 5A-5C, the electroactive material 521 is configured as a cantilever of, for instance, approximately 5 mm, over a cavity. The free end of electroactive material 521 supports a movable bracket 530, which includes a V-notch 534 that accommodates the end of first optical fiber portion 500. In one embodiment, movable bracket 530 is affixed to the free end of cantilevered electroactive material 521. Guide pins 531 and upper limit stops 532 are provided to ensure alignment of the first and second optical fiber portions 500, 510, with the electroactive material 521 in the state depicted in FIG. 5A. In the configuration of FIGS. 5A-5C, a shelf or ledge 533 is provided below movable bracket 530 as a lower limit stop.

As illustrated in FIGS. 5A-5B, in the embodiment depicted, electroactive material 521 is disposed, at least in part, between an upper plate 522 and a lower plate 523. As shown, lower plate 523 of electrically-controlled actuator 520 can extend across the cavity below the cantilevered electroactive material 521 to allow for contact of the lower plate with the free end of the electroactive material when, for instance, applied voltage changes. Note that in the embodiment of FIGS. 5A-5C, the cantilevered electroactive material can be installed angled downward, for a normal voltage-off condition. In that case, applying a voltage causes the electroactive material cantilever to flex upward, pushing the movable bracket 530 upward, and aligning the first and second optical fiber portions 500, 510. Note that, in the embodiment depicted, second optical fiber portion 510 is maintained in fixed position within a fixed V-mount support 540. In one or more implementations, the optical fiber portions 500, 510 can be fixed to the respective movable bracket 530 or V-mount support 540, with an epoxy or other adhesive. Moveable bracket 530 travels along the guide pins, with the base plate providing a lower limit, and the stops above providing an upper limit. Note also that the moveable bracket 530 can take a variety of configurations and, if desired, can be a solid structure.

Advantageously, the optical fiber switches of FIGS. 4A-5C utilize no additional optical elements, such as a mirror or a lens, that would require or introduce loss in the path of the optical signal. Thus, there is negligible loss with an optical fiber switch as described. Further, no motors are required, because the electroactive material, for instance, electroactive polymer, flexes with the voltage being applied. Further, as noted above, compared with existing solutions, the optical fiber switches disclosed herein are symmetric, meaning that an optical signal can be introduced to propagate in either direction through the fiber-optic switch.

FIGS. 6A-7B depict further embodiments of an optical fiber switch, in accordance with one or more aspects of the present invention. In these embodiments, the first and second optical fiber portions of the optical fiber switch remain fixedly aligned across the gap, and the fiber-optic switching system includes a movable opaque member, which has a position relative to the gap controlled by the electrically-controlled actuator.

Figure 6B:
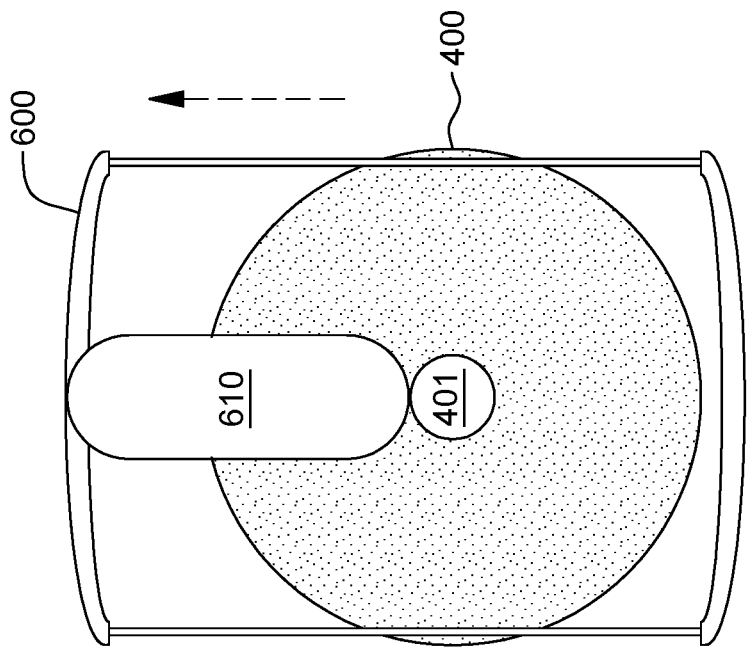
FIGS. 6A & 6B depict cross-sectional elevational views of a further embodiment of an optical fiber switch, illustrating a signal non-passing state and a signal-passing state, respectively, in accordance with one or more aspects of the present invention.
Figure 6A:
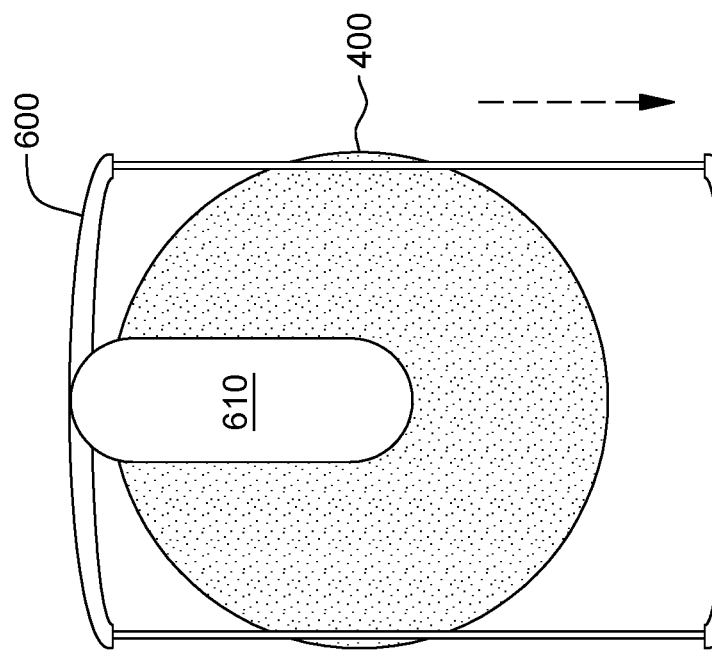

An example of this approach is depicted in FIGS. 6A-6B, where an electrically-controlled frame or shifting element 600 is movable, and includes an opaque member 610. In the embodiment illustrated, shifting the electrically-controlled frame downward (FIG. 6A) results in opaque member 610 being disposed within the gap between the first and second optical fiber portions so as to block light signal propagation from one core to the other, and shifting of the electrically-controlled frame and opaque member upward (FIG. 6B) results in movement of the opaque member away from the aligned fiber-optic cores of the first and second optical fiber portions. In particular, in the example of FIG. 6A, first optical fiber portion 400 of FIGS. 4A-4E is shown, with the electrically-controlled frame 600 positioned such that opaque member 610 overlies the optical core, while in FIG. 6B, the electrically-controlled frame 600 is positioned so that opaque member 610 is moved sufficiently such that fiber-optic core 401 of first optical fiber portion 400 is exposed, allowing a light signal to propagate from the core to the second optical fiber portion, as described above.

Figure 7A:
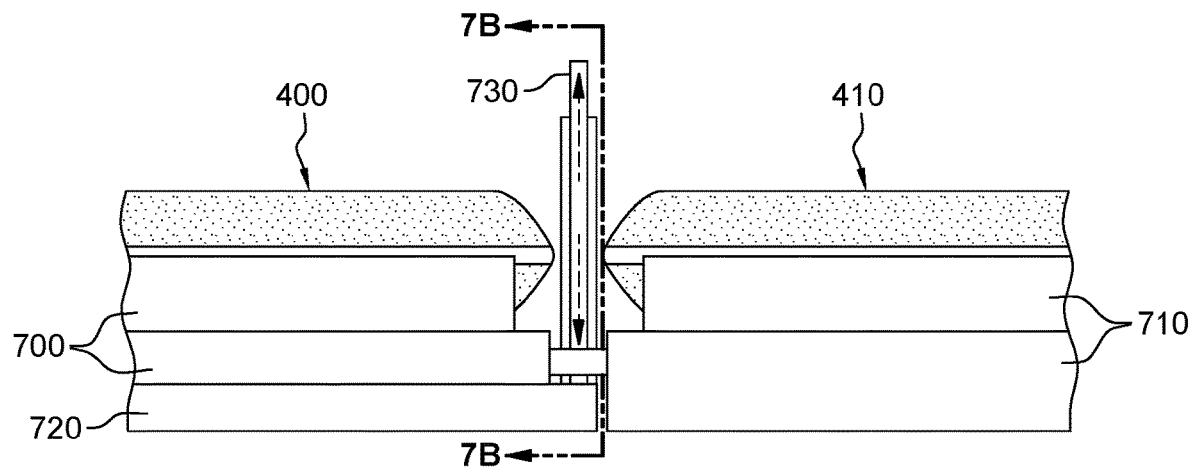
FIG. 7A depicts a more detailed embodiment of an optical fiber switch such as illustrated in FIGS. 6A & 6B, in accordance with one or more aspects of the present invention.
Figure 7B:
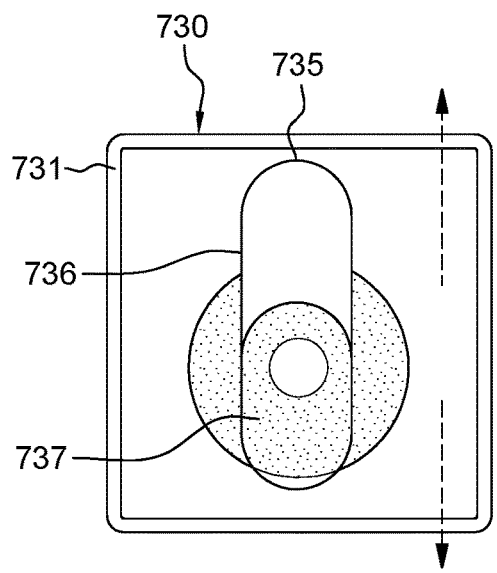
FIG. 7B is a partial elevational view of the optical fiber switch of FIG. 7A, taken along line 7B-7B thereof, in accordance with one or more aspects of the present invention.

In one or more embodiments, opaque member 610 can be a thin film opaque member that is moved up and down by electrically controlling position of the frame or shifting element. Advantageously, there can be a total suppression of light when the opaque member is positioned over the fiber-optic core to block light transmission, and when moved away from the core, light transmission is allowed across the gap from one fiber-optic portion to the other. As with the electrically-controlled actuators described above, in one or more embodiments, the electrically-controlled frame or shifting element is coupled to an electro-mechanical mechanism, such as the above-discussed electroactive material exhibiting a physical change with a change in applied electric field. FIGS. 7A-7B depict a more detailed embodiment of this aspect.

In FIGS. 7A-7B, an optical fiber switch is illustrated which includes first optical fiber portion 400 and second optical fiber portion 410, such as described above. Fixtures 700, 710 hold the first and second optical fiber portions 400, 410, respectively, in fixed alignment, with the above-discussed gap between the opposing ends or tips of the optical fiber portions. An electrically-controlled actuator 720 is mechanically coupled to a shifting element 730, which can include a frame 731 coupled to the electrically-controlled actuator. In the embodiment illustrated, frame 731 supports an element 735, which includes an opaque member or region 736 and a transparent or open region 737. Depending on the applied electric field to the electroactive material of electrically-controlled actuator 720, and the specific configuration of the coupling between the electrically-controlled actuator and the shifting element, either the opaque region 736 or transparent region 737 can be aligned in the gap between the cores of the aligned first and second optical fiber portions of the optical fiber switch.

Advantageously, the above-described embodiments minimize the technician's handling of individual fiber-optic connectors during testing/measurement. This in turn, results in improved efficiency. Further, the fiber-optic switching system described allows for the testing and measurement to be operated remotely, thereby reducing the risk of contamination, with minimal connector cycle plugging.

Figure 8:
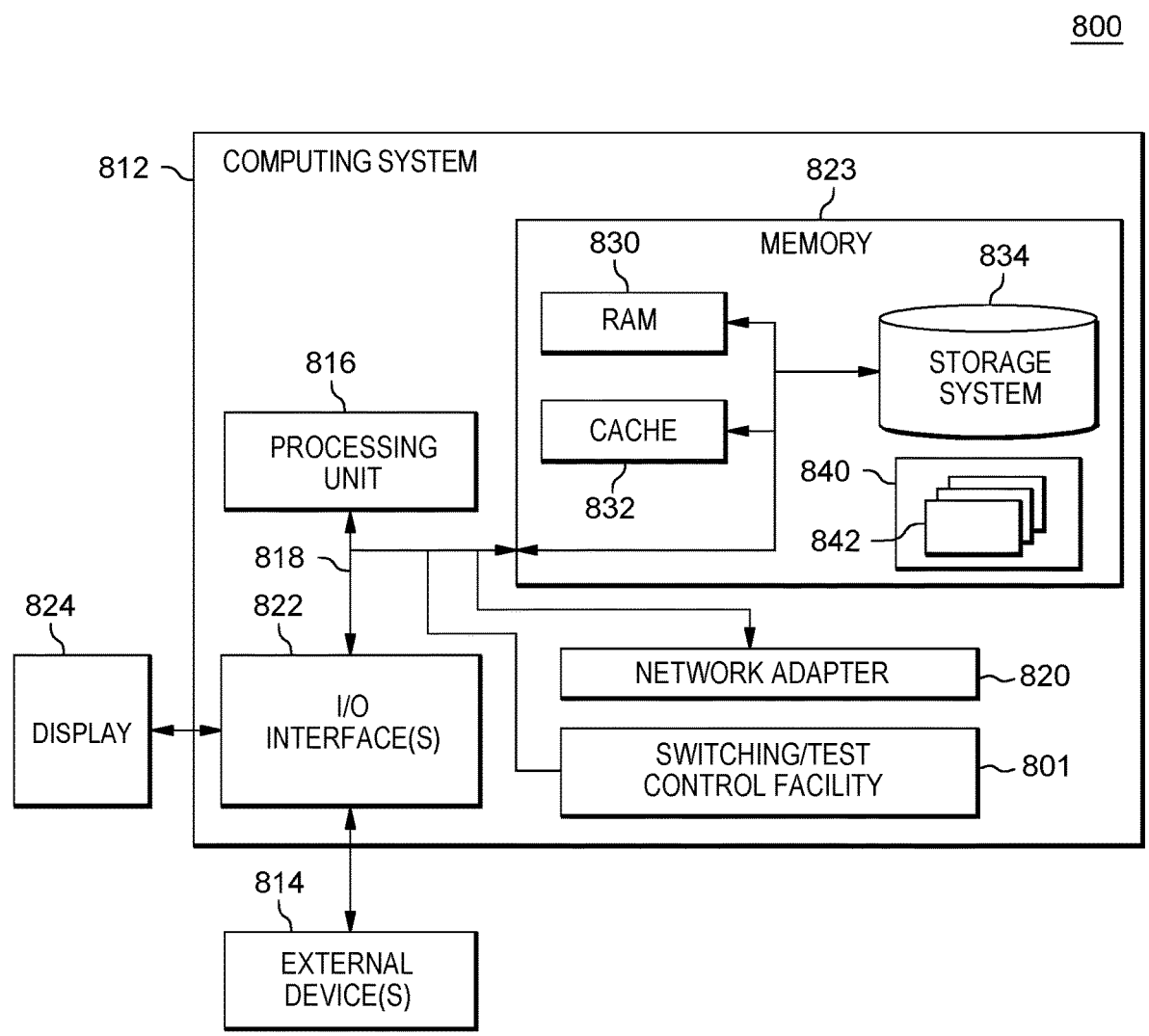
FIG. 8 depicts one embodiment of a computing system (or controller) for a fiber-optic switching system such as disclosed herein to facilitate control of transitioning of individual optical fiber switches between signal-passing and signal-non-passing states, in accordance with one or more aspects of the present invention.

By way of further example, FIG. 8 depicts one embodiment of a controller or computing environment 800, which includes a computing system 812 configured to implement one or more control and/or testing aspects of the present invention. Examples of well-known computing systems, environments, and/or configurations that can be suitable for use with computer system 812 include, but are not limited to, a mobile device, such as a wireless computer, a handheld or laptop computer or device, a mobile phone, a programmable consumer electronic device, a tablet, a personal digital assistant (PDA), or the like.

Computing system 812 can be described in the general context of computer system-executable instructions, such as program modules, being executed by a computer system. Generally, program modules can include routines, programs, objects, components, logic, data structures, and so on that perform particular tasks or implement particular abstract data types.

As depicted in FIG. 8, computing system 812, is shown in the form of a general-purpose computing device. The components of computing system 812 can include, but are not limited to, one or more processors or processing units 816, a system memory 823, and a bus 818 that couples various system components including system memory 823 to processor 816.

In one embodiment, processor 816 can be based on any one of multiple available operating system architectures, including mobile device operating systems.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 812 can include a variety of computer system readable media. Such media may be any available media that is accessible by computing system 812, and it includes both volatile and non-volatile media, removable and non-removable media.

System memory 823 can include computer system readable media in the form of volatile memory, such as random access memory (RAM) 830 and/or cache memory 832. Computing system 812 can further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 818 by one or more data media interfaces. As described below, memory 823 can include at least one program product having a set (e.g., at least one) of program modules that are configured to carry out the functions of embodiments of the invention.

Program/utility 840, having a set (at least one) of program modules 842, can be stored in memory 823 by way of example, and not limitation, as well as an operating system, one or more application programs, other program modules, and program data. Each of the operating system, one or more application programs, other program modules, and program data or some combination thereof, can include an implementation of a networking environment. Program modules 842 generally carry out various functions and/or methodologies of embodiments of the invention as described herein. Alternatively, a separate, switching/text control facility, module, logic, etc., 801 can be provided in associated with computing system 812 to facilitate implementing one or more failure detection and/or disconnect control processes such as described herein.

Computing system 812 can also communicate with one or more external devices 814, such as one or more electrically-controlled actuators of one or more optical fiber switches (as disclosed herein), a display 824, etc.; one or more devices that enable a user to interact with computing system 812; and/or any devices (e.g., network card, modem, etc.) that enable computing system 812 to communicate with one or more other computing devices. Such communication can occur via Input/Output (I/O) interfaces 822. Still yet, computing system 812 can communicate with one or more networks such as a local area network (LAN), a general wide area network (WAN), and/or a public network (e.g., the Internet) via network adapter 820. As depicted, network adapter 820 communicates with the other components of computing system, 812, via bus 818. It should be understood that although not shown, other hardware and/or software components could be used in conjunction with computing system 812. Examples, include, but are not limited to: microcode, device drivers, redundant processing units, external disk drive arrays, RAID systems, tape drives, and data archival storage systems, etc.

One or more aspects of the present invention, such as one or more aspects of the control aspect, can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects can be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider can receive payment from the customer under a subscription and/or fee agreement, as examples. Additionally or alternatively, the service provider can receive payment from the sale of advertising content to one or more third parties.

In one aspect, an application can be deployed for performing one or more embodiments. As one example, the deploying of an application comprises providing computer infrastructure operable to perform one or more embodiments.

As a further aspect, a computing infrastructure can be deployed comprising integrating computer readable code into a computing system, in which the code in combination with the computing system is capable of performing one or more embodiments.

As yet a further aspect, a process for integrating computing infrastructure comprising integrating computer readable code into a computer system can be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A fiber-optic switching system comprising:
   an optical fiber switch, the optical fiber switch comprising:
   a first optical fiber portion and a second optical fiber portion spaced apart with a gap therebetween, the gap being sized to allow for light signal coupling between the first and second optical fiber portions in a signal-passing state of the optical fiber switch;
   an electrically-controlled actuator coupled to transition the optical fiber switch between the signal-passing state, where the light signal is allowed to pass between the first and second optical fiber portions of the optical fiber switch, and a signal-non-passing state, where the light signal is prevented from passing between the first and second optical fiber portions of the optical fiber switch, the electrically-controlled actuator comprising an electroactive material exhibiting a physical change with change in an applied electric field, the physical change facilitating transitioning of the optical fiber switch between the signal-passing and the signal-non-passing states; and
   wherein the electroactive material comprises an electroactive polymer that exhibits a physical change with change in the applied electric field.

2. The fiber-optic switching system of claim 1, wherein in the signal-passing state of the optical fiber switch, the first and second optical fiber portions align, and in the signal-non-passing state, the first and second optical fiber portions misalign, the electrically-controlled actuator being coupled to the optical fiber switch to transition the first and second optical fiber portions between being aligned and being misaligned, and thereby transition the optical fiber state between the signal-passing state and the signal-non-passing state.

3. The fiber-optic switching system of claim 2, wherein in operation the electrically-controlled actuator is physically coupled to one optical fiber portion of the first and second optical fiber portions to transition the first and second optical fiber portions between being aligned and being misaligned with change in the applied electric field.

4. The fiber-optic switching system of claim 1, wherein the first optical fiber portion comprises a first convex fiber tip at the gap, the first convex fiber tip being configured to facilitate light signal coupling between the first and second optical fibers in the signal-passing state of the optical fiber switch.

5. The fiber-optic switching system of claim 4, wherein the second optical fiber portion comprises a second convex fiber tip at the gap, the first and second convex fiber tips being configured to facilitate light signal coupling between the first and second optical fibers in the signal-passing state of the optical fiber switch.

6. A fiber-optic switching system comprising:
   multiple optical fiber switches, a selected optical fiber switch of the multiple optical fiber switches comprising:
   a first optical fiber portion and a second optical fiber portion spaced apart with a gap therebetween, the gap being sized to allow for light signal coupling between the first and second optical fiber portions in a signal-passing state of the selected optical fiber switch;
   an electrically-controlled actuator coupled to transition the selected optical fiber switch of the multiple optical fiber switches between the signal-passing state, where the light signal is allowed to pass between the first and second optical fiber portions of the selected optical fiber switch, and a signal-non-passing state, where the light signal is prevented from passing between the first and second optical fiber portions of the selected optical fiber switch, the electrically-controlled actuator comprising an electroactive material exhibiting a physical change with change in an applied electric field, the physical change facilitating transitioning the selected optical fiber switch between the signal-passing and signal-non-passing states; and
   a fiber-optic coupler assembly coupling the multiple optical fiber switches in optical communication with a fiber-optic output of the fiber-optic switching system, the electrically-controlled actuator facilitating selectively allowing the light signal to pass through the selected optical fiber switch, for passage through the fiber-optic coupler assembly to the fiber-optic output of the fiber-optic switching system.

7. The fiber-optic switching system of claim 6, wherein the electrically-controlled actuator comprises an electroactive polymer that exhibits a physical change with change in the applied electric field.

8. The fiber-optical switching system of claim 6, wherein in the signal-passing state of the selected optical fiber switch, the first and second optical fiber portions align, and in the signal-non-passing state, the first and second optical fiber portions misalign, the electrically-controlled actuator being coupled to the selected optical fiber switch to transition the first and second optical fiber portions between being aligned and being misaligned, and thereby transition the optical fiber state between the signal-passing state and the signal-non-passing state.

9. The fiber-optic switching system of claim 8, wherein the electrically-controlled actuator is physically coupled to one optical fiber portion of the first and second optical fiber portions to transition the first and second optical fiber portions between being aligned and being misaligned with change in the applied electric field.

10. The fiber-optic switching system of claim 6, wherein the first optical fiber portion comprises a first convex fiber tip at the gap, the first convex fiber tip being configured to facilitate light signal coupling between the first and second optical fibers in the signal-passing state of the selected optical fiber switch.

11. The fiber-optic switching system of claim 10, wherein the second optical fiber portion comprises a second convex fiber tip at the gap, the first and second convex fiber tips being configured to facilitate light signal coupling between the first and second optical fibers in the signal-passing state of the selected optical fiber switch.

12. The fiber-optic switching system of claim 6, wherein the first and second optical fiber portions of the selected optical fiber switch are aligned across the gap, and the fiber-optic switching system further comprises:
a movable opaque member with a position relative to the gap controlled by the electrically-controlled actuator; and
wherein in the signal-passing state, the movable opaque member is positioned offset from the aligned first and second optical fiber portions, allowing the light signal to pass between the first and second optical fiber portions, and in the signal-non-passing state, the movable opaque member is positioned between the aligned first and second optical fiber portions, preventing the light signal from passing between the first and second optical fiber portions of the selected optical fiber switch.

13. The fiber-optic switching system of claim 12, wherein the movable opaque member comprises an opaque membrane sized to reside in the gap between the aligned first and second optical fiber portions in the signal-non-passing state of the selected optical fiber switch to prevent the light signal from passing between the first and second optical fiber portions.

14. A method of fabricating a fiber-optic switching system comprising:
fabricating an optical fiber switch, the fabricating comprising:
providing a first optical fiber portion and a second optical fiber portion spaced apart with a gap therebetween, the gap being sized to allow for light signal coupling between the first and second optical fiber portions in a signal-passing state of the optical fiber switch;
providing an electrically-controlled actuator to transition the optical fiber switch between the signal-passing state, where the light signal is allowed to pass between the first and second optical fiber portions of the optical fiber switch, and a signal-non-passing state, where the light signal is prevented from passing between the first and second optical fiber portions of the optical fiber switch, the electrically-controlled actuator comprising an electroactive material exhibiting a physical change with change in an applied electric field, the physical change facilitating transitioning of the optical fiber switch between the signal-passing and signal-non-passing states; and
wherein the electroactive material comprises an electroactive polymer that exhibits a physical change with change in the applied electric field.

* * * * *